United States Patent
Perrin et al.

(10) Patent No.: US 10,698,597 B2
(45) Date of Patent: Jun. 30, 2020

(54) REFLOW OF HANDWRITING CONTENT

(71) Applicant: Lenovo (Singapore) Pte. Ltd., Singapore (SG)

(72) Inventors: Steven Richard Perrin, Raleigh, NC (US); Jianbang Zhang, Cary, NC (US); John Weldon Nicholson, Cary, NC (US); Scott Edwards Kelso, Cary, NC (US); Bradley Park Strazisar, Cary, NC (US); Matthew Lloyd Hagenbuch, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 433 days.

(21) Appl. No.: 14/580,798

(22) Filed: Dec. 23, 2014

(65) Prior Publication Data
US 2016/0179772 A1 Jun. 23, 2016

(51) Int. Cl.
*G06F 17/20* (2006.01)
*G06F 3/0488* (2013.01)
*G06F 40/106* (2020.01)
*G06F 40/171* (2020.01)

(52) U.S. Cl.
CPC ........ *G06F 3/04883* (2013.01); *G06F 40/106* (2020.01); *G06F 40/171* (2020.01)

(58) Field of Classification Search
CPC .................................................. G06F 3/04883
See application file for complete search history.

(56) References Cited

U.S. PATENT DOCUMENTS

| 5,596,350 A * | 1/1997 | Capps ................... G06F 17/211 345/173 |
| 6,021,218 A | 2/2000 | Capps et al. |
| 7,259,752 B1 * | 8/2007 | Simmons ............ G06F 3/04817 345/173 |
| 2003/0053084 A1 * | 3/2003 | Geidl ..................... G06F 17/24 358/1.6 |
| 2005/0168451 A1 | 8/2005 | Dodge et al. |
| 2008/0170789 A1 | 7/2008 | Thacker |
| 2009/0021530 A1 | 1/2009 | Ishiguro |

FOREIGN PATENT DOCUMENTS

| CN | 1501239 A | 6/2004 |
| CN | 1517904 A | 8/2004 |
| CN | 1802689 A | 7/2006 |
| CN | 101256462 A | 9/2008 |
| CN | 101930545 A | 12/2010 |
| CN | 104063176 A | 9/2014 |
| EP | 1349056 A2 * | 10/2003 ........... G06F 3/0481 |

* cited by examiner

*Primary Examiner* — Shahid K Khan
(74) *Attorney, Agent, or Firm* — Ference & Associates LLC

(57) ABSTRACT

One embodiment provides a method, including: accepting, in an input overlay application, handwriting ink strokes; determining handwriting units for the handwriting ink strokes; accepting editing input of the handwriting ink strokes; and reflowing handwriting ink strokes based on the editing input. Other embodiments are described and claimed.

17 Claims, 5 Drawing Sheets

REFLOW OF HANDWRITING CONTENT

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay, e.g., a rectangle in a lower portion of a touch screen display. In this area the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of handwriting input may be placed into an underlying application, e.g., an image of the user's signature.

BRIEF SUMMARY

In summary, one aspect provides a method, comprising: accepting, in an input overlay application, handwriting ink strokes; determining handwriting units for the handwriting ink strokes; accepting editing input of the handwriting ink strokes; and reflowing handwriting ink strokes based on the editing input.

Another aspect provides an electronic device, comprising: an input and display device; a processor operatively coupled to the input and display device; and a memory that stores instructions executable by the processor to: accept, in an input overlay application, handwriting ink strokes; determine handwriting units for the handwriting ink strokes; accept editing input of the handwriting ink strokes; and reflow handwriting ink strokes based on the editing input.

A further aspect provides a product, comprising: a storage device having code stored therewith, the code being executable by a processor of an electronic device and comprising: code that accepts, in an input overlay application, handwriting ink strokes; code that determine handwriting units for the handwriting ink strokes; code that accept editing input of the handwriting ink strokes; and code that reflows handwriting ink strokes based on the editing input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
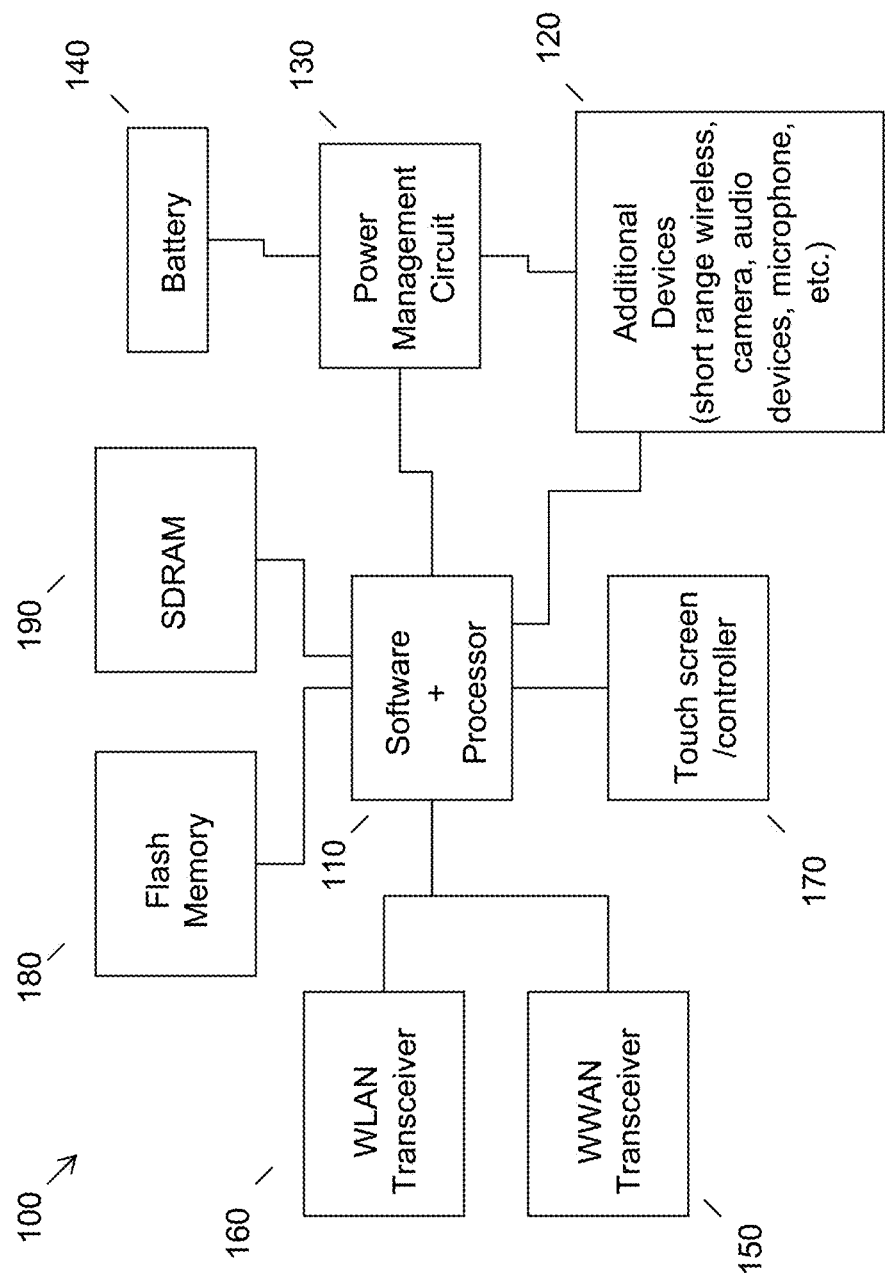
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Handwritten documents often have an implicit layout structure. Structures like lines and paragraphs are suggested by the whitespace that the writer has left on the page. It is difficult to maintain an established layout while editing a handwritten document. Existing note taking applications allow users to erase ink or to insert space between rows of ink. However, these applications inevitably leave whitespace in the document that is inconsistent with the initially established layout. What is needed is a system that will behave more like a word processor when handling ink strokes. That is, the system should permit handwritten words to be dynamically moved in response to insertion or removal of content.

An embodiment provides such a system. In an embodiment, the structure of the user's handwriting is analyzed dynamically, as the user writes. The result of the layout analysis includes grouping of strokes that are identified as belonging to individual words, grouping of strokes that are identified as belonging to lines, grouping of strokes that are identified as belonging to paragraphs, locations of the left and right edges of lines and paragraphs (margins), identification of spacing between words, lines and paragraphs (e.g., average spacing).

An embodiment also supports gesture control of the handwriting content in terms of editing. For example, with gestures such as a pen input symbol a user may indicate a desire to insert or delete handwriting. By way of example, in response to a delete gesture such as a line-through gesture, the handwriting indicated by the gesture (in this example, the ink strokes that are lined through) is removed. Remaining handwriting is moved (repositioned, reflowed) so as to maintain the previously identified layout, e.g., according to rules akin to word processors handling typeset.

By way of specific example, the logical associations created by an embodiment for the handwriting form logical units of handwriting (e.g., words, characters) that may be handled as typeset is currently handled (e.g., reflowed in response to addition or deletions therein, introduction of white space, carriage returns, etc.). An embodiment determines the formatting of the handwritten document dynamically and using the units of handwriting within the formatting framework may automatically reflow handwritten text as if it were machine typeset.

For example, handwriting units on the same line as deleted handwriting units may be reflowed or repositioned, with the handwriting units to the left of the deletion being unchanged and handwriting units to the right of the deletion being shifted to the left (assuming left to right language), i.e., removing whitespace units after the deletion. For handwriting units on each line of a paragraph below the deletion, complete handwritten word units are moved to the left end of the line directly above until the width of the line matches the determined width of the paragraph block. Remaining handwriting units on the line is shifted to align with the left margin of the paragraph block. For handwriting units on paragraphs below the deletion, the complete paragraph is moved up so as to maintain the spacing that existed previously. Similarly, in response to an insert gesture, whitespace is created (e.g., to the right of the insert gesture) by shifting writing to the right and down while maintaining layout properties. As the user writes, this whitespace grows dynamically to create more space for subsequent words, similar to inserting typeset characters in a word processing document.

Because an embodiment creates handwriting units that may be handled similarly to typeset, the user may select, copy, cut and paste the handwriting units. For example, a user may drag and drop handwritten words into or out of a paragraph. As the handwritten word is moved through a new position, other handwritten words in the paragraph may be animated to move so as to maintain the layout of the paragraph block.

With other gestures or control inputs, the user may modify layout properties. For example, when changing the width of a paragraph, handwriting may be moved so as to make each line of the paragraph as close as possible to the desired width, taking into account the size of the handwriting units, similar to the size of typeset words. This action may be performed continuously, in real-time. For example, as the user drags the edge of the paragraph, e.g., via pen input to a page control situated at the top of the input interface, handwriting units are repeatedly moved to match the new layout size of the paragraph block.

Handwriting ink strokes may be grouped into a handwriting unit using handwriting recognition to associate the ink strokes with a logical word. Handwriting units may take the form an area associated with the ink strokes, aligned according to formatting rules (e.g., along lines, spaced and sized according to determined line spacing and margins).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
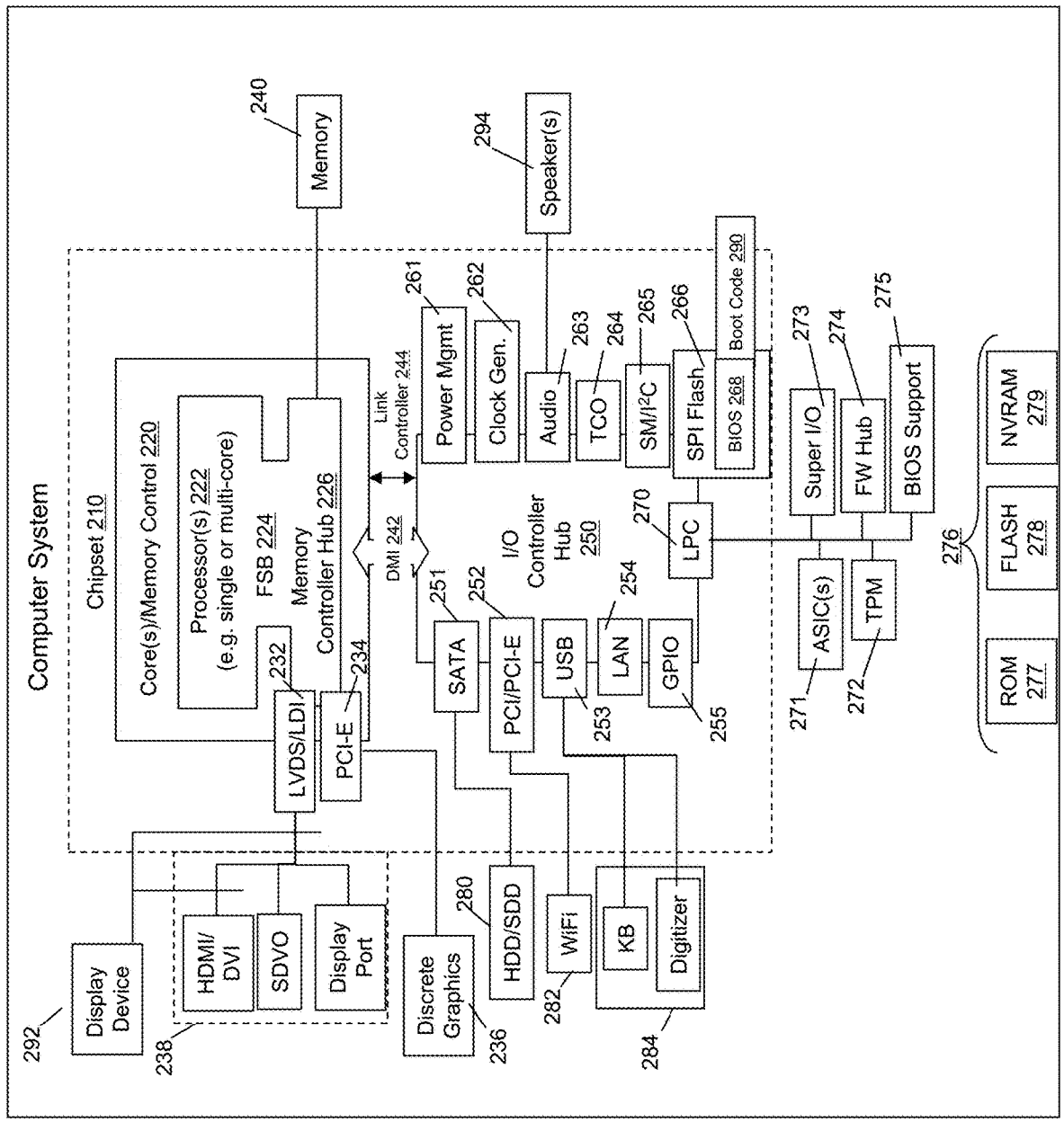
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric input/security devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices. Users may employ these devices for various functions, e.g., inputting handwriting strokes as an input modality to an Internet search application, an email application, a text messaging or instant messaging application, with fillable forms, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept handwriting strokes and provides visual displays of input characters, conversions of handwritten characters or strokes to machine text, presentation of candidate, replacement or alternative words and the like.

Figure 3A:
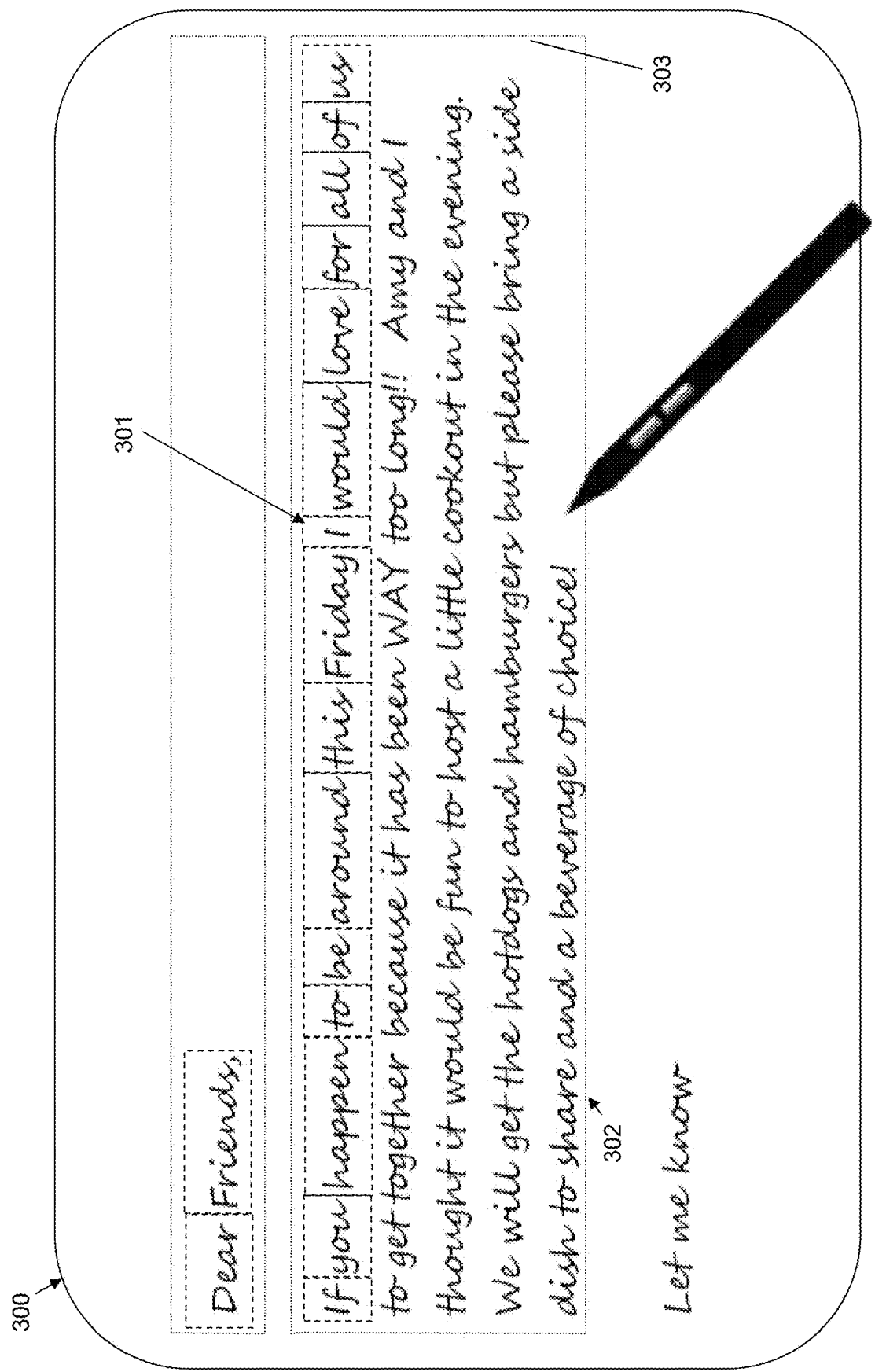
FIG. 3(A-C) illustrates an example of reflowing handwriting content.

Referring to FIG. 3A by way of example, a user may provide handwriting ink strokes in an input overlay application implemented in a device 300 such as a tablet computing device. Here the handwriting ink strokes are in the form of an email. An embodiment analyzes the handwritten ink to determine handwriting units, indicated by the dashed blocks in FIG. 3(A-C), one of which is indicated specifically at 301. An embodiment may also analyze the handwriting ink strokes to determine, e.g., line spacing and length, such that a block unit may be determined, two of which are indicated by the dotted lines in FIG. 3A. The handwriting units, e.g., 301, are logical associations of ink strokes, e.g., a handwriting unit includes the letter I alone as it forms a word. Likewise, another handwriting unit is used for neighboring ink strokes forming "Friday" and still another is used for "would" in the same line. The block length is determined for example by the average line length or the longest handwritten line's length. In the example of FIG. 3A, the rightmost boundary of a paragraph block is indicated by 303. The formatting (e.g., paragraph block(s), line spacing, etc.) may be determined dynamically, e.g., adjusted as the user provides handwriting ink inputs.

A user may provide such handwriting ink strokes, including formatting, and have the ink strokes input into an underlying application, e.g., an underlying email application as used in this non-limiting example. Furthermore, an embodiment may convert the handwritten ink strokes to machine input such that it may be displayed as typeset. The typeset may retain the formatting indicated by the user in the ink strokes.

In an embodiment, the handwriting ink strokes may be reflowed or repositioned, e.g., based on editing input. Editing input for the purposes of this description may be considered any input that requires a reflowing of the ink strokes in order to maintain (as near as possible) the handwriting characteristics of the user's original ink inputs. Thus, editing inputs may include, but are not limited to insertion of new content, deletion of existing content, repositioning content, or combinations of the foregoing.

Figure 3B:
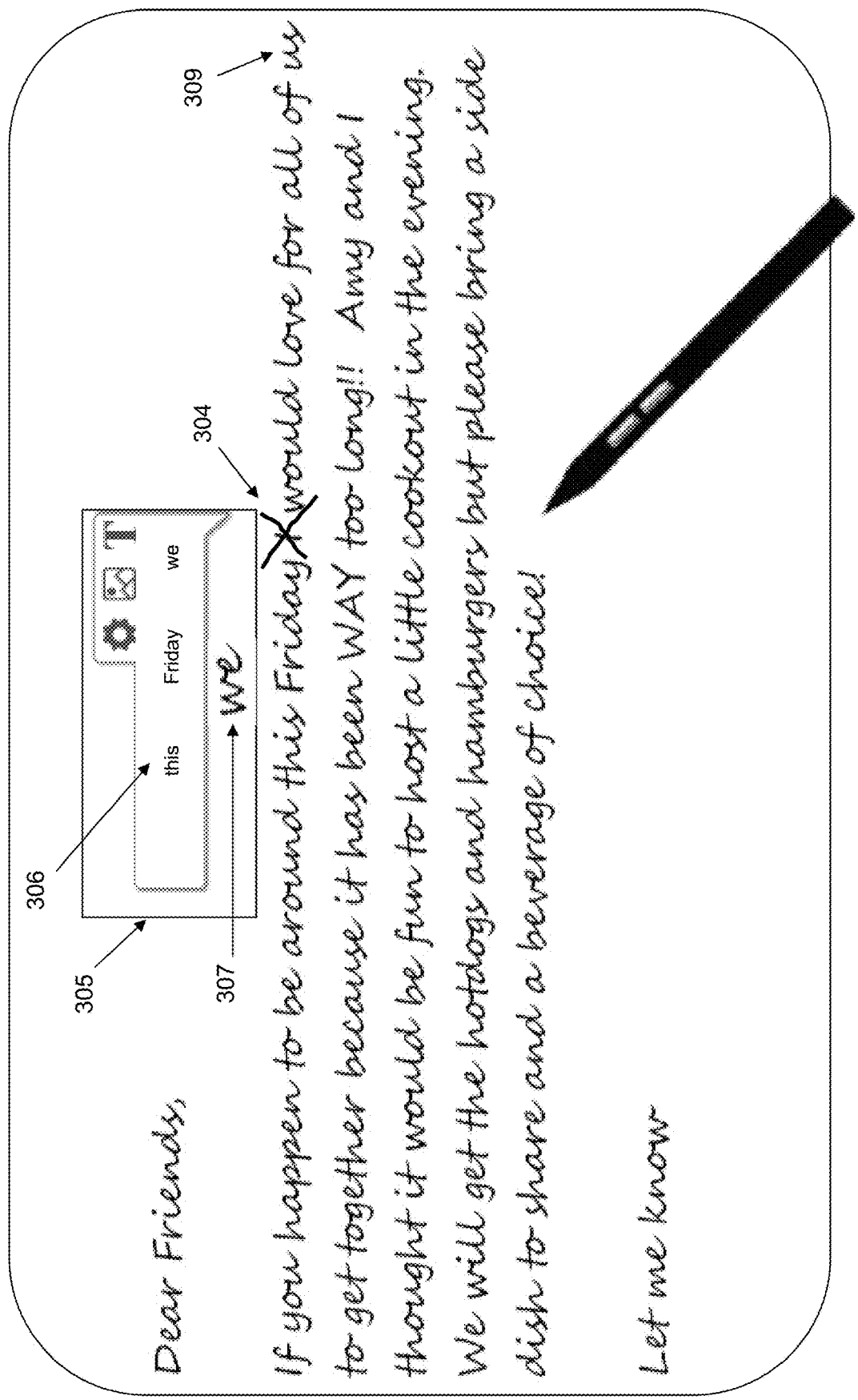

By way of illustrative example, as shown in FIG. 3B, a user may provide an editing input such as an gesture ink stroke, here in the form of an "X" indicated at 304 over the existing ink stroke "I." The overlay input application accepts this gesture input and interprets it as a deletion request associated with the underlying ink stroke "I."

The overlay input application thus provides an input field overlay 305 that includes a preview and control area 306, which offers a preview of the handwriting recognition interpretation of the ink strokes as type set (in this example the typeset "this" and "Friday" for corresponding ink strokes, as well as typeset preview "we" for the new input) and offers input controls (here a settings control, a graphic input control, and a typeset input control). The input field overlay 305 also provides the user with an area 307 in which new ink strokes may be input, e.g., to replace the deleted ink stroke at 304. In this example, the user has provided new ink strokes forming the word "we" to the area 307, as previewed in handwriting recognition preview area 306.

Figure 3C:
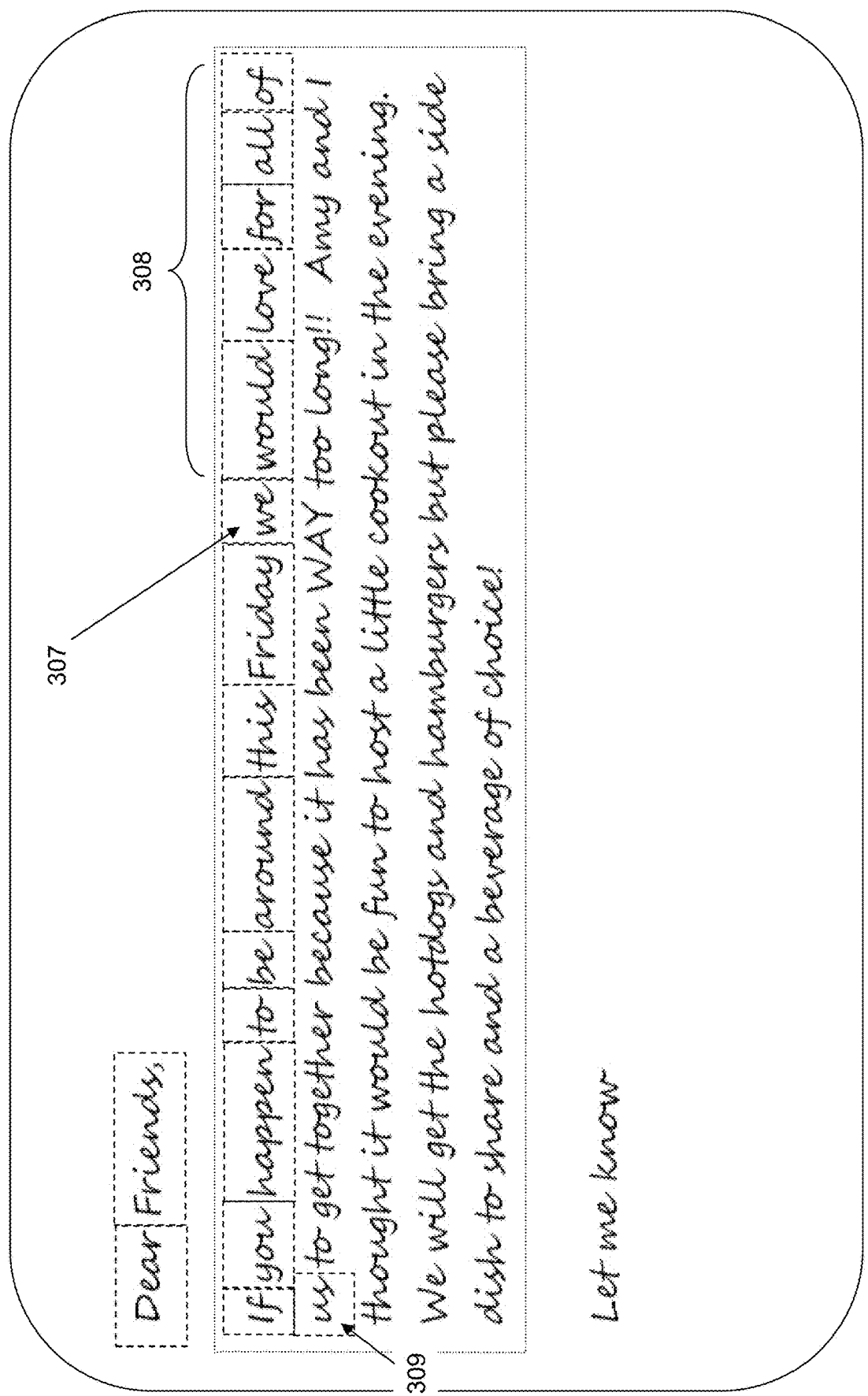

Accordingly, as illustrated in FIG. 3C, an embodiment may thereafter input the new handwriting ink strokes "we" into the existing handwriting ink strokes, e.g., in between "Friday" and "would," as illustrated. An embodiment also uses handwriting unit data (indicated visually for clear illustration by way of the dashed lines) to reflow the handwriting ink strokes. In this example, the handwriting unit for ink strokes "we" indicated at 307 of FIG. 3C is larger than that for ink strokes "I" indicated at 301 of FIG. 3A. Given the block size for this paragraph, and margin 303, an embodiment reflows the handwriting units of "would," "love," "for," "all," and "of" by shifting them to the right to accommodate new handwriting unit size of "we" at 307. Additionally, an embodiment wraps the handwriting unit "us" from its original position (FIG. 3A) to the following line, i.e., as indicated at 309 of FIG. 3C. This permits the new handwriting ink strokes of "we" to fit into the first line while maintaining block margin 303.

As may be appreciated, a similar action may be used for inserting new handwriting ink strokes and for deleting existing handwriting ink strokes. Further, an embodiment may dynamically grow an insertion handwriting unit to accommodate the new handwriting ink strokes, e.g., if the user had written "we both" rather than "we" to replace ink stroke "I." Thus, the reflowing includes dynamically reflowing of the handwriting units based on the insertion handwriting unit size and/or block dimensions.

Because the overall formatting of the handwriting input is analyzed, e.g., a block unit for the handwriting ink strokes is determined, the reflowing of the entire block unit may be accomplished in a coordinated fashion. As such, the editing input may include additional movement of handwriting ink strokes, such as a drag movement of a handwriting unit (e.g., word, sentence, or entire block may be cut and pasted) and the handwriting units and/or blocks may be reflowed accordingly. Likewise, document level controls, e.g., moveable paragraph guides such as displayed margin line 303 of FIG. 3A, may be implemented such that the user may adjust block size and location, with the handwriting units reflowed accordingly.

An embodiment therefore represents a technical improvement in providing reflowing of handwritten ink strokes such that a user may provide and maintain formatting, even if the handwriting ink is later edited. This assists the user by more intelligently linking the visual display of the handwriting ink strokes to the user's intentions. The various embodiments make the handwriting input modality more user friendly. Moreover, the various embodiments improve the handwriting input process by providing the user with the ability to edit ink strokes (and converted typeset) in-line, without needing to engage in time consuming re-inputting of large amounts of data.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
accepting, in an input overlay application, handwriting ink strokes;
determining handwriting units for the handwriting ink strokes;
determining a block unit for the handwriting units;
providing margin controls in the input overlay application based on a size of the block unit;
accepting editing input associated with the block unit, wherein the editing input comprises a margin change; and
automatically reflowing the block unit in a coordinated fashion based on the margin change.

2. The method of claim 1, wherein:
the editing input comprises an insertion gesture; and
the reflowing further comprises inserting new handwriting ink strokes as a new handwriting unit between two existing handwriting units.

3. The method of claim 2, further comprising dynamically growing an insertion handwriting unit to accommodate the new handwriting ink strokes.

4. The method of claim 3, wherein the reflowing comprises dynamically reflowing the handwriting units based on the insertion handwriting unit size.

5. The method of claim 1, wherein:
the editing input comprises a deletion gesture; and
the reflowing comprises deleting one of the handwriting units and repositioning any remaining handwriting ink strokes.

6. The method of claim 1, wherein the reflowing comprises shifting one or more handwriting units laterally.

7. The method of claim 1, wherein the reflowing comprises shifting one or more handwriting units vertically.

8. The method of claim 1, wherein:
the editing input comprises a drag movement of a handwriting unit; and
wherein the reflowing comprises further reflowing the block unit based on the drag movement.

9. An electronic device, comprising:
an input and display device;

a processor operatively coupled to the input and display device; and a memory that stores instructions executable by the processor to:

accept, in an input overlay application, handwriting ink strokes;

determine handwriting units for the handwriting ink strokes;

determine a block unit for the handwriting units;

provide margin controls in the input overlay application based on a size of the block unit;

accept editing input associated with the block unit, wherein the editing input comprises a margin change; and automatically reflow the block unedited handwriting unit in a coordinated fashion based on the margin change.

10. The electronic device of claim 9, wherein:

the editing input comprises an insertion gesture; and to reflow comprises inserting new handwriting ink strokes as a new handwriting unit between two existing handwriting units.

11. The electronic device of claim 10, wherein the instructions are executable by the processor to dynamically grow an insertion handwriting unit to accommodate the new handwriting ink strokes.

12. The electronic device of claim 11, wherein to reflow comprises dynamically reflowing the handwriting units based on the insertion handwriting unit size.

13. The electronic device of claim 9, wherein:

the editing input comprises a deletion gesture; and to reflow comprises deleting one of the handwriting units and repositioning any remaining handwriting ink strokes.

14. The electronic device of claim 9, wherein to reflow comprises shifting one or more handwriting units laterally.

15. The electronic device of claim 9, wherein to reflow comprises shifting one or more handwriting units vertically.

16. The electronic device of claim 9, wherein:

the editing input comprises a drag movement of a handwriting unit; and wherein to reflow comprises further reflowing the block unit based on the drag movement.

17. A product, comprising:

a non-transitory storage device having code stored therewith, the code being executable by a processor of an electronic device and comprising:

code that accepts, in an input overlay application, handwriting ink strokes;

code that determine handwriting units for the handwriting ink strokes;

code that determines a block unit for the handwriting units;

code that provides margin controls in the input overlay application based on a size of the block unit;

code that accepts editing input associated with the block unit, wherein the editing input comprises a margin change; and code that automatically reflows the block unit in a coordinated fashion based on the margin change.

* * * * *